J. G. G. GARRETT.
Improvement in Insect-Destroyers.
No. 133,023.    Patented Nov. 12, 1872.
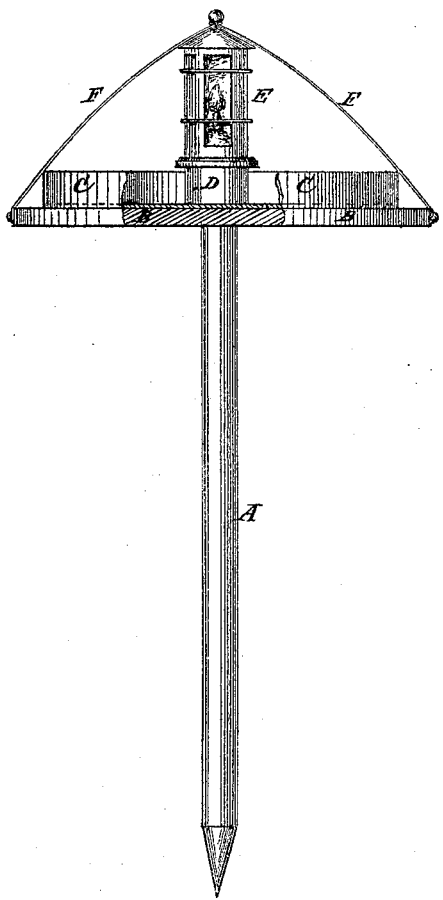
Witnesses:
A. W. Almqvist
M. H. Brooks
Inventor:
J. G. G. Garrett
Per Munn & Co.
Attorneys.

UNITED STATES PATENT OFFICE.

JAMES G. G. GARRETT, OF PORT GIBSON, MISSISSIPPI.

IMPROVEMENT IN INSECT-DESTROYERS.

Specification forming part of Letters Patent No. 133,023, dated November 12, 1872.

*To all whom it may concern:*

Be it known that I, JAMES G. G. GARRETT, of Port Gibson, in the county of Claiborne and State of Mississippi, have invented a new and useful Improvement in Insect-Exterminator; and I do hereby declare that the following is a full, clear, and exact description thereof, which will enable others skilled in the art to make and use the same, reference being had to the accompanying drawing forming part of this specification, in which—

The figure is a side view, partly in section, of my improved device.

This invention relates to that class of devices for destroying or catching nocturnal insects which consist essentially of a dish or pan containing molasses or other sticky substance and a lamp, the light of which decoys the insects into the pan. All such traps now in use are provided with bails or similar contrivances for the purpose of suspending them where wanted. They are thus subject to be oscillated or even overturned by the wind, causing the spilling of the substance in the pan—essential to the proper operation of the trap—and often, also, the extinguishment of the lamp or lantern. Suspending such a trap in fruit-trees is not so objectionable, because it is protected by the foliage against violent oscillations; but when used in open fields of growing crops, such as cotton, tobacco, &c., it becomes a very serious drawback, to remedy which is the object of my invention. To this end my improvement consists in rigidly securing the pan and its lamp or lantern to a stake of proper length, providing a device complete in itself, especially adapted for use in open fields of growing crops, and not liable to serious interference from high winds.

A is a stake driven into the ground, and to the upper end of which is nailed or otherwise securely attached a board or plank, B, which should be about eighteen inches, more or less, across. Upon the plank B is placed a sheet-iron pan, C, about eighteen inches across and two inches deep. In the center of the pan C is placed a block or support, D, about two inches high, upon which is set an ordinary lantern, E. The lantern E is secured in place by being connected with the edges of the plank B by two or more cords, F.

This device is set among the plants to be protected, is lighted about dark, and enough coal-tar, molasses, or other suitable viscous material is poured into the pan C to a little more than cover its bottom. The insects will be attracted by the light, and flying toward it, will fall into the pan C, and being unable to escape from it will be destroyed. One or more of these devices should be used for each acre of the field to be protected.

Having thus described my invention, I claim as new and desire to secure by Letters Patent—

In an insect-destroyer I claim the following instrumentalities in combination, namely: A stake, A, stand B, block D, lamp E, and supporting cords F, all arranged as and for the purpose specified.

JAMES G. G. GARRETT.

Witnesses:
JOHN J. SMITH,
WALTER McDOUGALL.